(12) United States Patent
Daley et al.

(10) Patent No.: US 10,550,933 B2
(45) Date of Patent: Feb. 4, 2020

(54) HYDRAULIC SYSTEM FOR MAINTAINING MINIMUM LOW SIDE PRESSURE OF CLOSED CIRCUIT HYDRAULIC SYSTEM

(71) Applicant: DANFOSS POWER SOLUTIONS INC., Ames, IA (US)

(72) Inventors: Christian S. Daley, Ames, IA (US); Nicholas Creager, Ames, IA (US); Matt Dorenkamp, Huxley, IA (US); Eric R. Jacobson, Ankeny, IA (US)

(73) Assignee: DANFOSS POWER SOLUTIONS INC., Ames, IA (US)

( * ) Notice: Subject to any disclaimer, the term of this patent is extended or adjusted under 35 U.S.C. 154(b) by 0 days.

(21) Appl. No.: 15/946,880

(22) Filed: Apr. 6, 2018

(65) Prior Publication Data
US 2018/0291797 A1 Oct. 11, 2018

Related U.S. Application Data

(60) Provisional application No. 62/482,887, filed on Apr. 7, 2017.

(51) Int. Cl.
*F16H 61/4026* (2010.01)
*F16H 61/4052* (2010.01)
(Continued)

(52) U.S. Cl.
CPC ....... *F16H 61/4026* (2013.01); *F04B 49/002* (2013.01); *F16H 61/4052* (2013.01);
(Continued)

(58) Field of Classification Search
CPC ............. F16H 61/4026; F16H 61/4043; F16H 61/4052; F16H 61/4104; F16H 61/4139
(Continued)

(56) References Cited

U.S. PATENT DOCUMENTS 4,628,690 A * 12/1986 Arai ..................... F16H 61/4043
60/464
6,179,570 B1 1/2001 Smith
(Continued)

FOREIGN PATENT DOCUMENTS

EP 2975304 A1 1/2016

OTHER PUBLICATIONS

German Office Action dated Mar. 21, 2019, German Patent Application No. 1020182051941; Danfoss Power Solutions.
(Continued)

*Primary Examiner* — Michael Leslie
(74) *Attorney, Agent, or Firm* — Zarley Law Firm, PLC (57) ABSTRACT

A hydraulic system that has a hydraulic pump connected to and in communication with a hydraulic motor, at least one hydraulic cylinder, or both by a first conduit and a second conduit (i.e., a high side and a low side). The hydraulic system has a bypass valve connected to and in communication with the first conduit and the second conduit. The bypass valve has a preset pressure that is above a minimum low side pressure. When a shock load occurs in the hydraulic system and a related drop in pressure on the low side occurs, the bypass valve opens when the preset pressure is passed thereby preventing the pressure from dropping to the minimum low side pressure. The hydraulic system thereby avoids a low loop event that could cause damage to the hydraulic system without the presence of larger charge pumps or accumulators.

10 Claims, 7 Drawing Sheets

(51) Int. Cl.
 F16H 61/4104 (2010.01)
 F16H 61/4139 (2010.01)
 F04B 49/00 (2006.01)
(52) U.S. Cl.
 CPC ..... *F16H 61/4104* (2013.01); *F16H 61/4139* (2013.01); *F04B 2205/16* (2013.01); *F15B 2211/20507* (2013.01)
(58) Field of Classification Search
 USPC .......................................... 60/464, 468, 487
 See application file for complete search history.

(56) References Cited

U.S. PATENT DOCUMENTS

| | | | | |
|---|---|---|---|---|
| 6,681,570 | B2* | 1/2004 | Takada | F16H 61/4026 60/468 |
| 6,837,047 | B2* | 1/2005 | Dong | F16H 61/4104 60/464 |
| 7,430,860 | B2* | 10/2008 | Whitaker | F16H 61/4104 60/464 |
| 8,347,620 | B2* | 1/2013 | Yu | F16H 61/4104 60/464 |
| 8,826,654 | B2 | 9/2014 | Nelson et al. | |
| 8,857,168 | B2* | 10/2014 | Opdenbosch | E02F 9/2217 60/464 |
| 9,587,652 | B2 | 3/2017 | Glaz et al. | |
| 2012/0134848 | A1 | 5/2012 | Nelson et al. | |
| 2013/0227939 | A1 | 9/2013 | Hornberg et al. | |
| 2015/0240940 | A1 | 8/2015 | Schmidt et al. | |

OTHER PUBLICATIONS

EP2975304—English Translation.
German Office Action dated Mar. 21, 2019, German Patent Application No. 1020182051941; Danfoss Power Solutions. English Translation.
Chinese Office Action dated Jun. 24, 2019, Chinese Patent Application No. 201810304681.9, Danfoss Power Solutions.
Chinese Office Action dated Jun. 24, 2019, Chinese Patent Application No. 201810304681.9; Danfoss Power Solutions. English Translation.

* cited by examiner

HYDRAULIC SYSTEM FOR MAINTAINING MINIMUM LOW SIDE PRESSURE OF CLOSED CIRCUIT HYDRAULIC SYSTEM

CROSS REFERENCE TO RELATED APPLICATION

This application claims the benefit to U.S. Application No. 62/482,887 filed Apr. 7, 2017, incorporated by reference herein.

BACKGROUND OF THE INVENTION

This invention is directed to a hydraulic system and more particularly a closed circuit hydraulic system that utilizes a bypass valve to maintain minimum low side pressure.

In a closed circuit, a pump and a motor are used to transfer power from a power source connected to a pump shaft to a load connected to the motor shaft. In a closed circuit system, hydraulic fluid flows from the pump to the motor and then from the motor directly back to the pump to form a "loop".

To transfer power from the pump to the motor, hydraulic fluid pressure has to be higher on one side of the loop as compared to the other. The higher of the two pressures is called the high side and the lower of the two pressures is called the low side. A charge pump is often used to make up for leakages in the system to maintain pressure on the low side. Sometimes a closed circuit pump is connected directly to one or more hydraulic cylinder and hydraulic fluid is returned directly from the hydraulic cylinders back to the pump.

Often, in a closed circuit system a minimum low side pressure needs to be maintained while the system is operating. Maintaining a minimum low side pressure becomes problematic when a shock load occurs, resulting in a steep pressure rise rate. When this occurs, fluid is compressed causing the hose or conduit to expand, and oil is pumped into the high side. Meanwhile, significantly less fluid is returned from the motor back to the pump, which causes the pressure on the low side to lower due to the charge pump's inability to compensate for the fluid required during the shock load. This event is commonly referred to as a low loop event which can cause damage to the pump and the motor.

To address fluctuations in the low side, accumulators and large charge pumps have been used. Accumulators are a pressure reservoir that contains uncompressed fluid under pressure. Although useful, accumulators are expensive to incorporate into a system and costly to maintain due to the level of skill a serviceperson must have. Accumulators are unreliable due to issues related to running out of fluid, which renders them ineffective.

Alternatively or in addition, larger charge pumps or extra-large charge pumps are added to a system. These types of charge pumps are less efficient due to the heat added to the system.

Thus, it is a primary objective of this invention to improve upon the state of the art.

Another objective of this invention is to prevent low loop events during a shock load.

Yet another objective is to eliminate the need for accumulators and other low efficiency, high cost, or high maintenance elements used to avoid low loop events.

These and other objectives, features, and advantages of the invention will become apparent from the specification and claims.

SUMMARY OF THE INVENTION

A hydraulic system has a hydraulic pump connected to and in communication with a hydraulic motor, at least one hydraulic cylinder, or both by a first conduit and a second conduit (i.e., a high side and a low side). The hydraulic system has a bypass valve connected to and in communication with the first conduit and the second conduit. The bypass valve has a preset pressure that is above a minimum low side pressure. When a shock load occurs in the hydraulic system and a related drop in pressure on the low side occurs, the bypass valve opens when the preset pressure is passed thereby preventing the pressure from dropping to the minimum low side pressure. The hydraulic system thereby maintains a minimum low side pressure of the closed circuit hydraulic system.

The hydraulic system provides a constant connection with the low side downstream of a loop flush shuttle and using this low loop pressure as a signal to open a bypass valve allowing fluid to flow from the high side to the low side if the low side pressure drops beyond a threshold. One of the benefits of the new system is that the need for accumulators is eliminated. As a result, the system is less expensive, in part, because accumulators are expensive and often require a higher level service person. Also, the system is more reliable and will work every time as compared to those with accumulators that can run out of flow and become ineffective.

Another benefit is that the hydraulic system eliminates the need for large or extra-large charge pumps. While sometimes useful in solving the problem of a low loop event, these charge pumps are less efficient.

DETAILED DESCRIPTION

Figure 1:
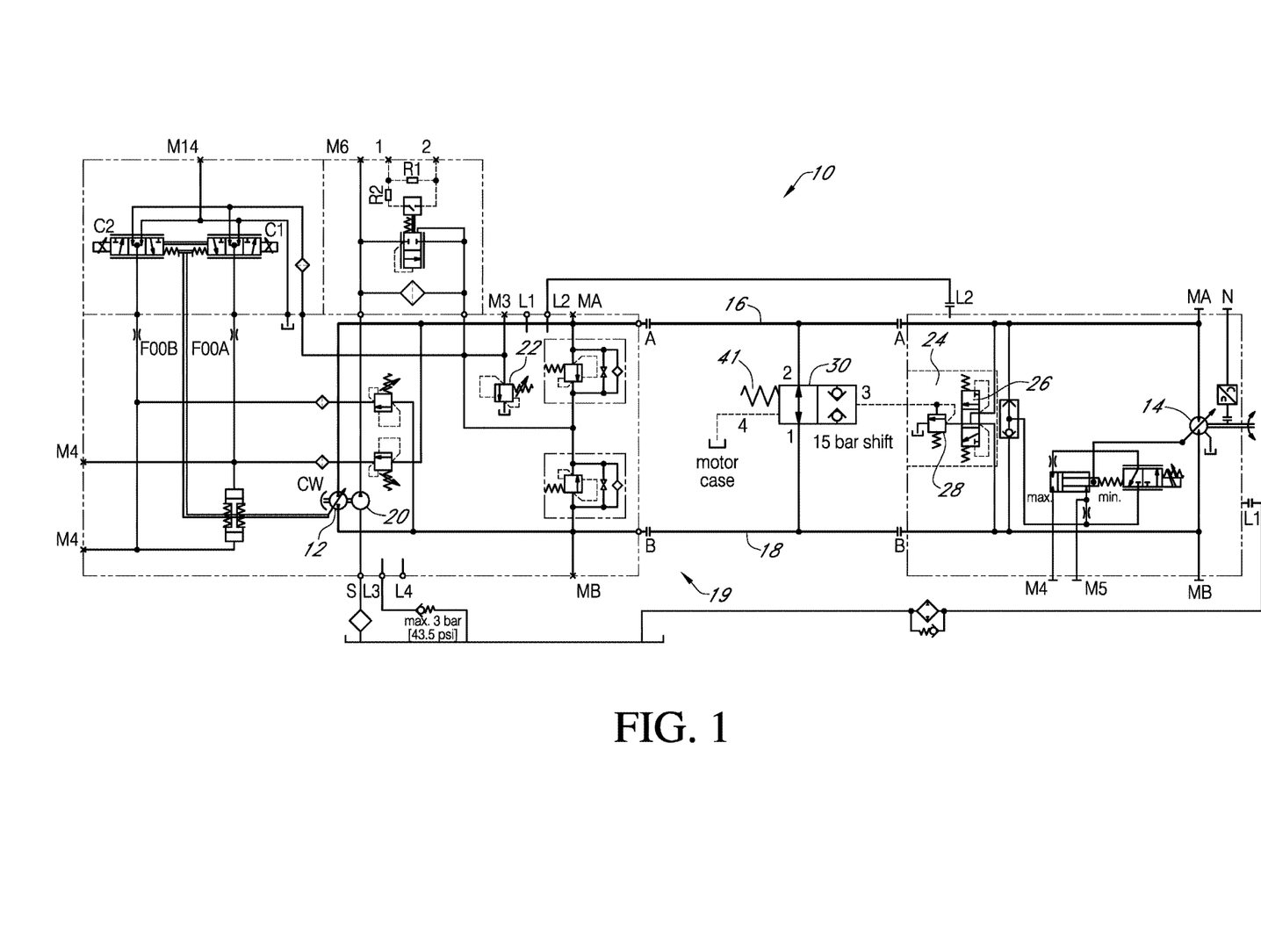
FIG. 1 is a schematic of a hydraulic system for maintaining minimum low side pressure of a closed circuit hydraulic system.

Referring to the Figures, a hydraulic system 10 includes a hydraulic pump 12 driven by a conventional engine or prime mover (not shown). In one embodiment the hydraulic pump 12 is a variable displacement hydraulic pump 12. The hydraulic pump 12 is connected to and in communication with a hydraulic motor 14 by a first conduit 16 and a second conduit 18 to form a closed circuit 19. Although the two are interchangeable, for exemplary purposes, the first conduit 16 will be referred to as indicating the high side 16*a* and the second conduit 18 will be referred to as the low side 18*a*. The hydraulic pump 12 in some embodiments is connected to at least one hydraulic cylinder (not shown) in place of the hydraulic motor 14 or in addition to the hydraulic motor to form the closed circuit 19.

A fixed displacement charge pump or charge pump 20 is coupled to the hydraulic pump 12 and replenishes fluid losses that occur in the closed circuit 19 during operation. A charge pressure relief valve 22 establishes a charge pressure 23 (not shown) at which the charge pump 20 delivers fluid to the low side 18a of the closed circuit 19. Other conventional items, such as pressure limiter valves, high pressure relief valves, valves for controlling the displacement of the pump and motor, and filters are included in the system 10, but these items are well-known in the art and not particularly relevant to the present invention.

Connected between and in communication with both the high side 16a and the low side 18a is a loop flushing system 24. The loop flushing system 24 is of any type and can be internal to the hydraulic pump 12 or the hydraulic motor 14 or in a separate valve anywhere in-between the hydraulic pump 12 and the hydraulic motor 14. In the example shown, the loop flushing system 24 includes a shuttle valve 26 and a relief valve 28. Also connected to and in communication with both the high side 16a and the low side 18a, in parallel with the loop flushing system 24, is the bypass valve 30. Upon opening or shifting, the bypass valve 30 ports fluid from the high side 16a to the low side 18a. This is especially effective when the bypass valve 30 is directly downstream from the loop flushing system 24.

The bypass valve 30 has a preset pressure 32 that is above a minimum low side pressure 34. The minimum low side pressure 34 is equal to or just above a threshold for a low loop event 36. In one embodiment, the bypass valve 30 fully opens when the fluid pressure in the low side 18a is equal to or goes below the preset pressure 32. This arrangement is referred to as a fast open 38.

Alternatively, the bypass valve 30 opens partially when the fluid pressure in the low side 18a is equal to or goes below the preset pressure 32. The bypass valve 30 continues to open as pressure lowers on the low side 18a and is gradually opened throughout the lowering of pressure or instantaneously upon becoming equal to or below the minimum low side pressure 34. These arrangements are referred to as a slow open 40. The slow open 40, in one arrangement, is accomplished by the addition of a spring chamber orifice 41 of the bypass valve 30.

Although both the fast open 38 and the slow open 40 prevent the low loop event 36, the two differ. The fast open 38 results in more fluid going into the low side 18a as seen in FIG. 5. The slow open 40 results in a smoother transition in the system 10 as shown in FIG. 4B. Both the fast open 38 and the slow open 40 eliminate the need for the inclusion of accumulators, large charge pumps, and extra-large charge pumps (not shown).

Figure 2:
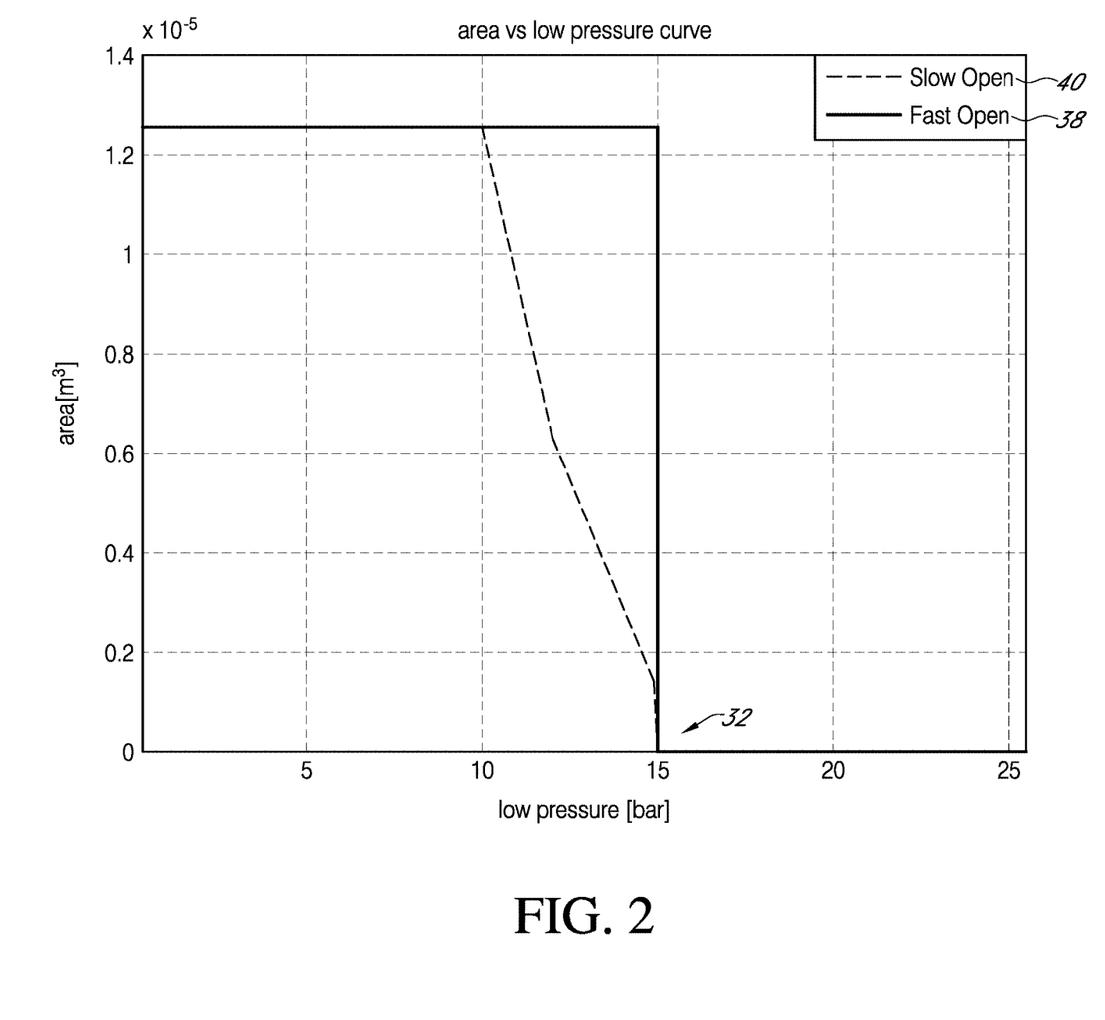
FIG. 2 is a graph of a bypass valve open area versus low pressure for a hydraulic system for maintaining minimum low side pressure of a closed circuit hydraulic system.
Figure 3A:
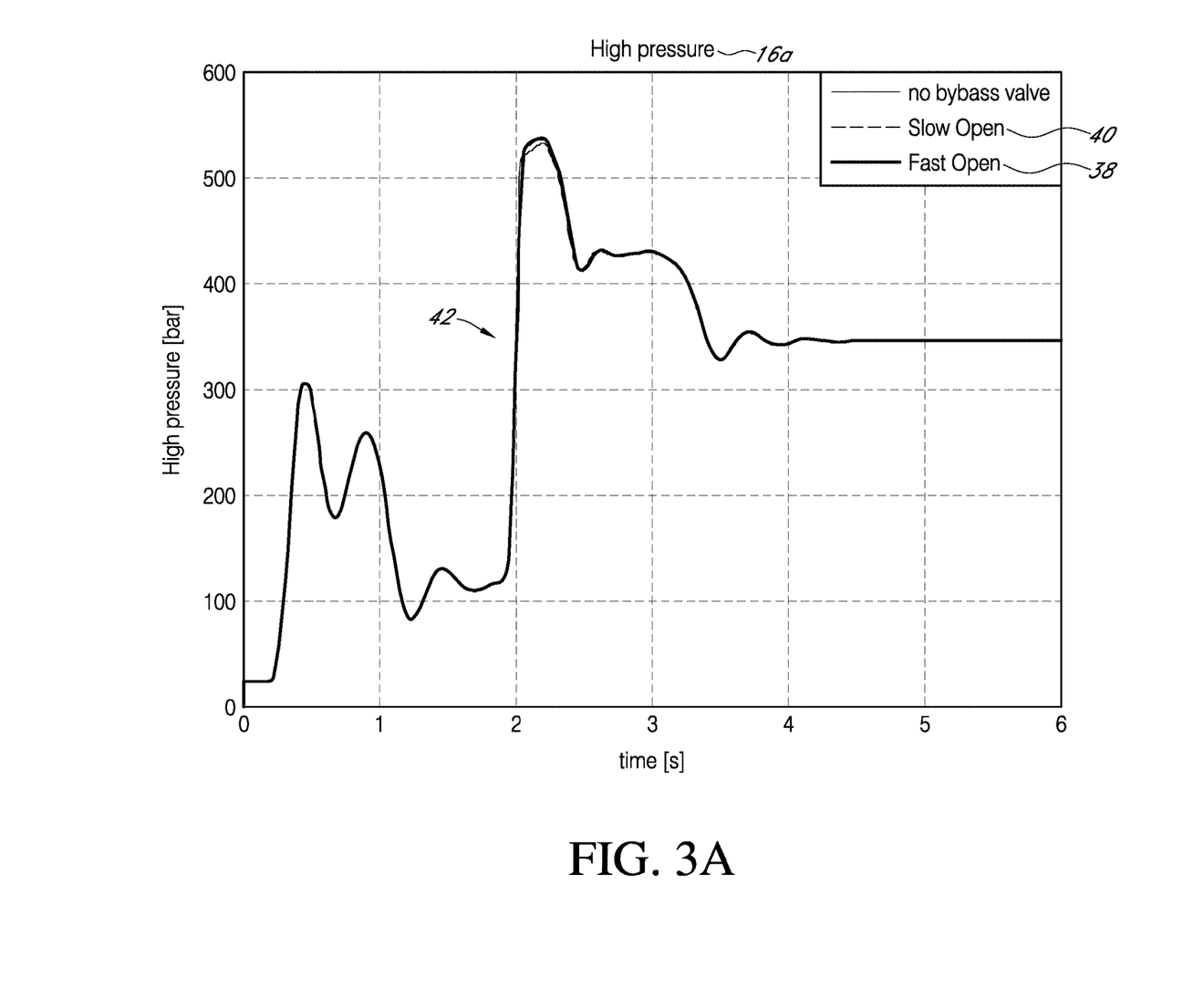
FIG. 3A is a graph of a shock load on a hydraulic system for maintaining minimum low side pressure of a closed circuit hydraulic system
Figure 3B:
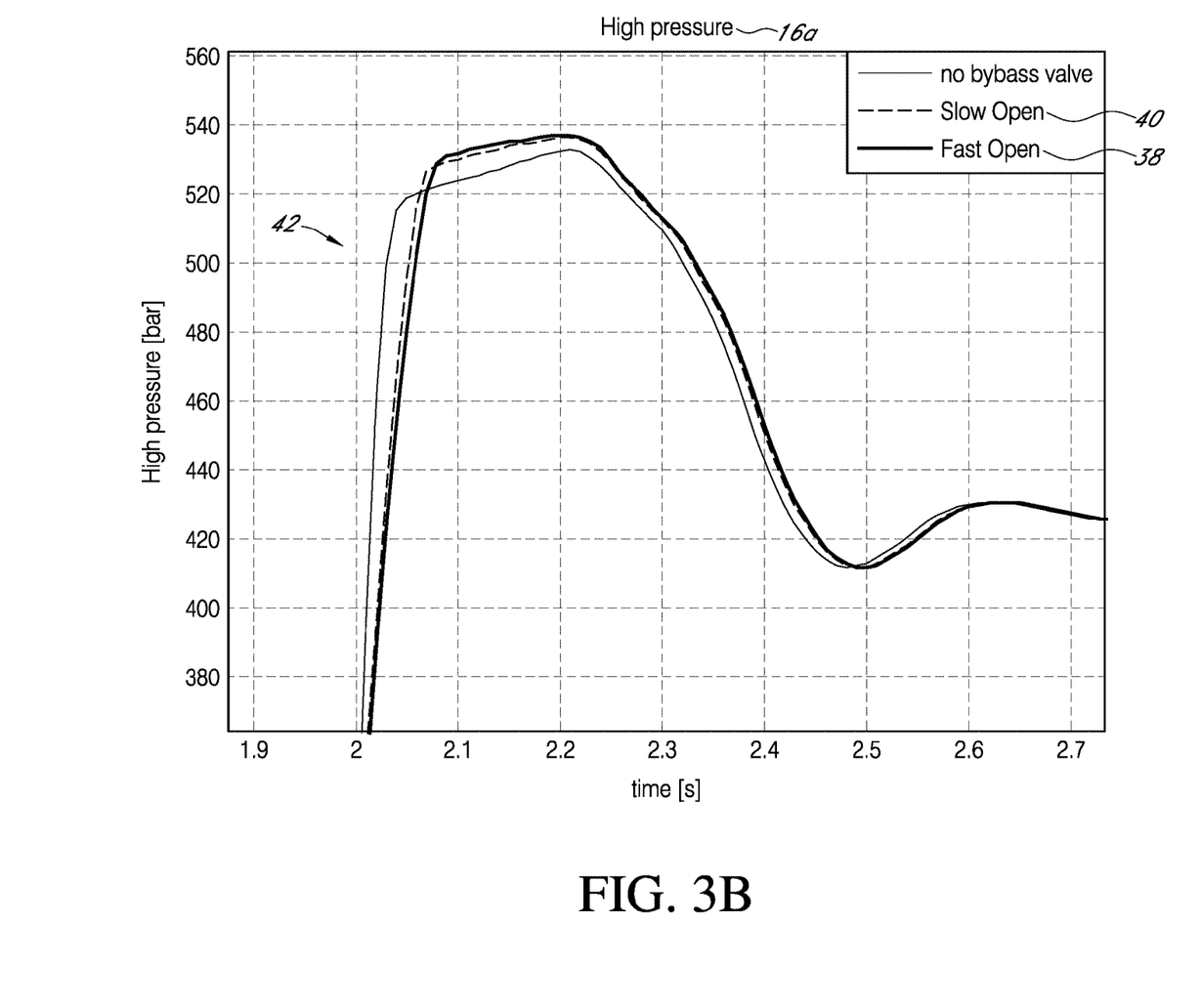
FIG. 3B is a graph of a shock load on a hydraulic system for maintaining minimum low side pressure of a closed circuit hydraulic system

Examples of the system 10 are depicted in FIGS. 2-5. The exemplary system 10 was tested by simulating the shock load 40 of 3,000-5,000 psi/sec, using a standard motor load, inertia of about 0.5-2 kg m^2, and the loop flushing system 24 is an "open in neutral" type. The hydraulic pump 12 speed is 1800 rpm. The preset pressure 32 of the bypass valve 30 is 15 bar and the minimum low side pressure 34 is 10 bar. The examples show the system 10 operating with a fast open 38 and a slow open 40 as shown in FIG. 2. FIGS. 3A-4B also show operation of the system 10 without the bypass valve 30 present.

FIGS. 2-5 show a shock load 42 occurring at approximately 2 seconds. As depicted in FIG. 3B, the presence of the bypass valve 30 delays the full effect of the shock load 42 due to fluid going from the high side 16a to the low side 18a.

Figure 4A:
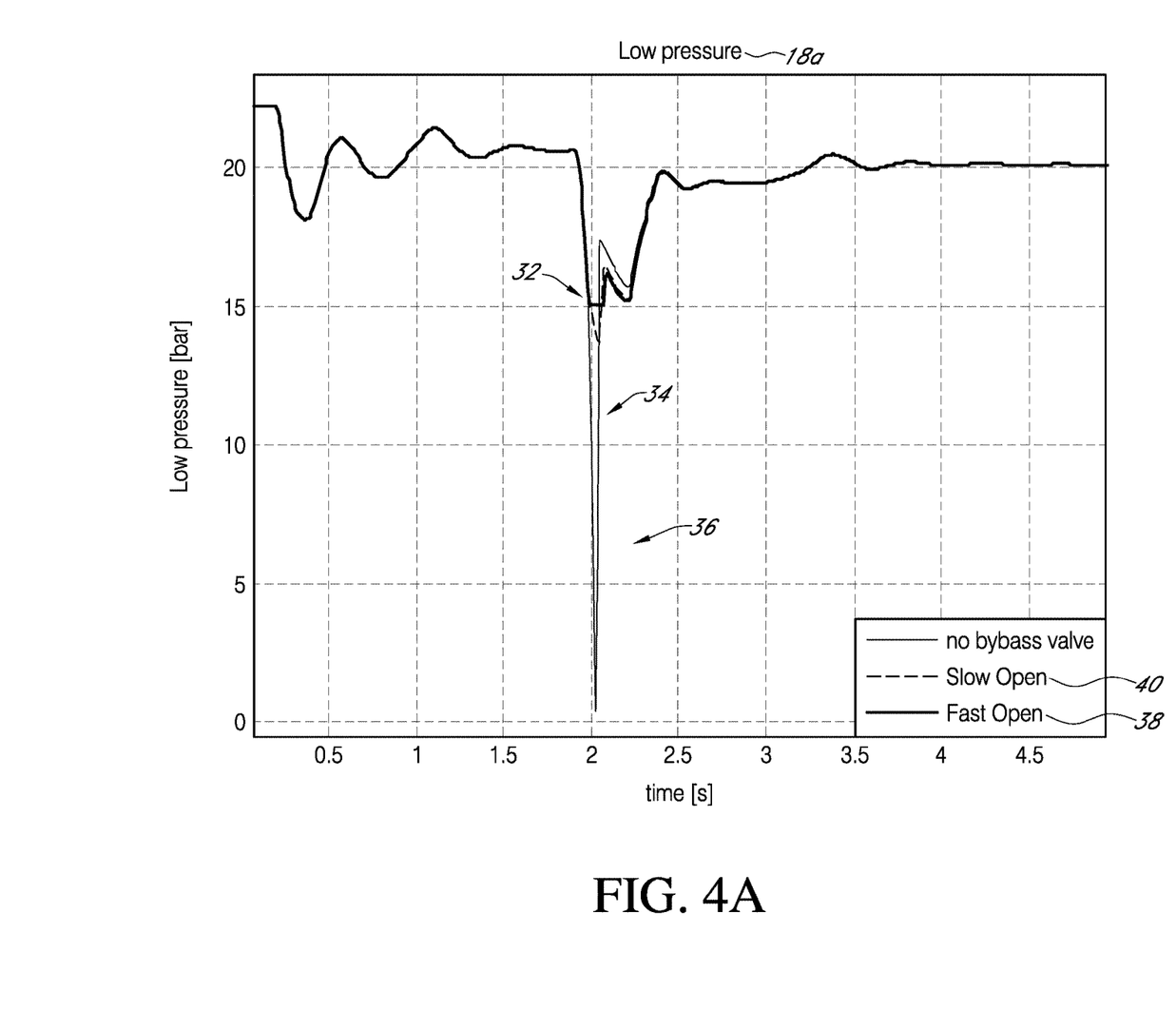
FIG. 4A is a graph of a shock load on a hydraulic system for maintaining minimum low side pressure of a closed circuit hydraulic system.
Figure 4B:
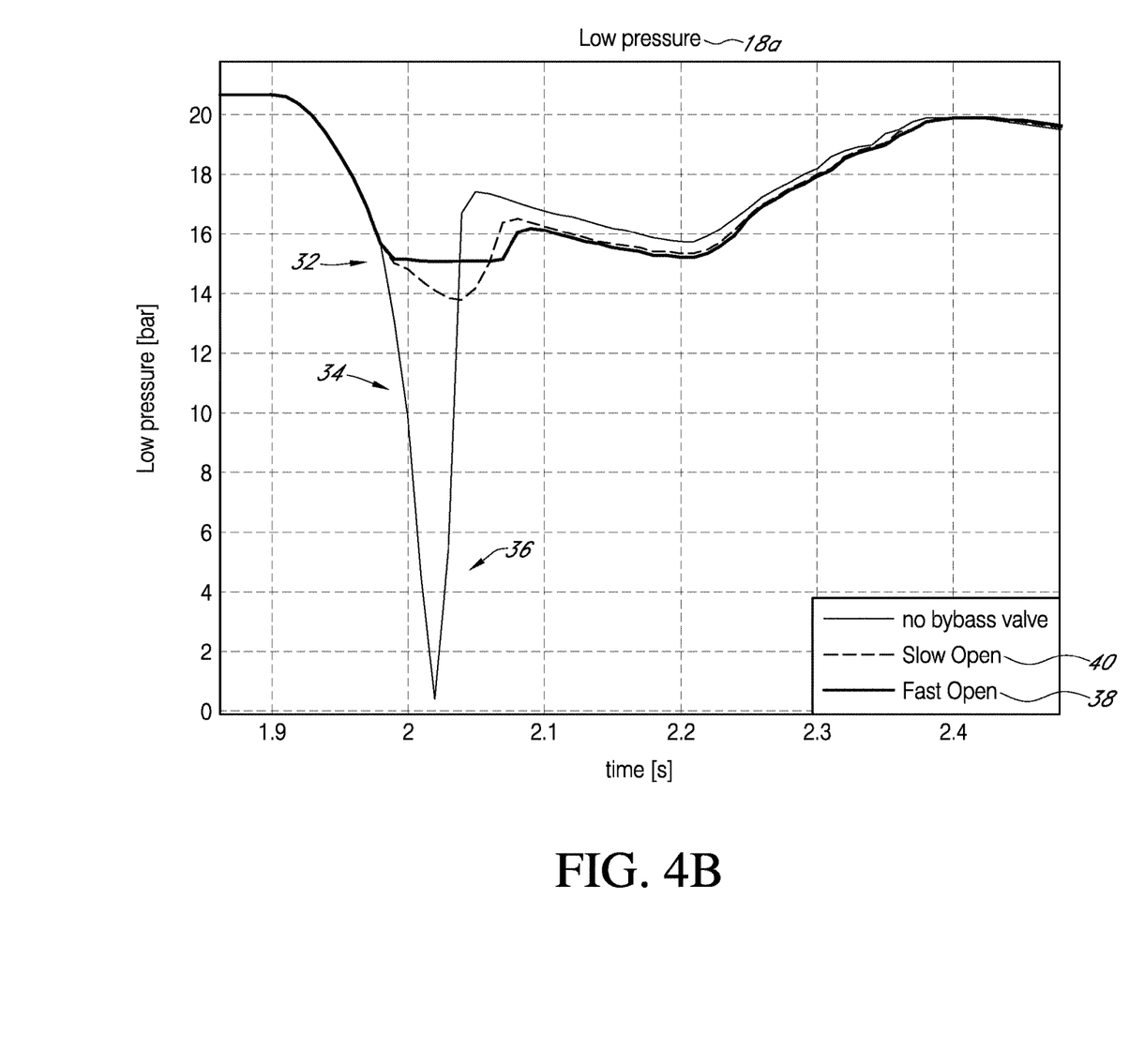
FIG. 4B is a graph of a shock load on a hydraulic system for maintaining minimum low side pressure of a closed circuit hydraulic system.
Figure 5:
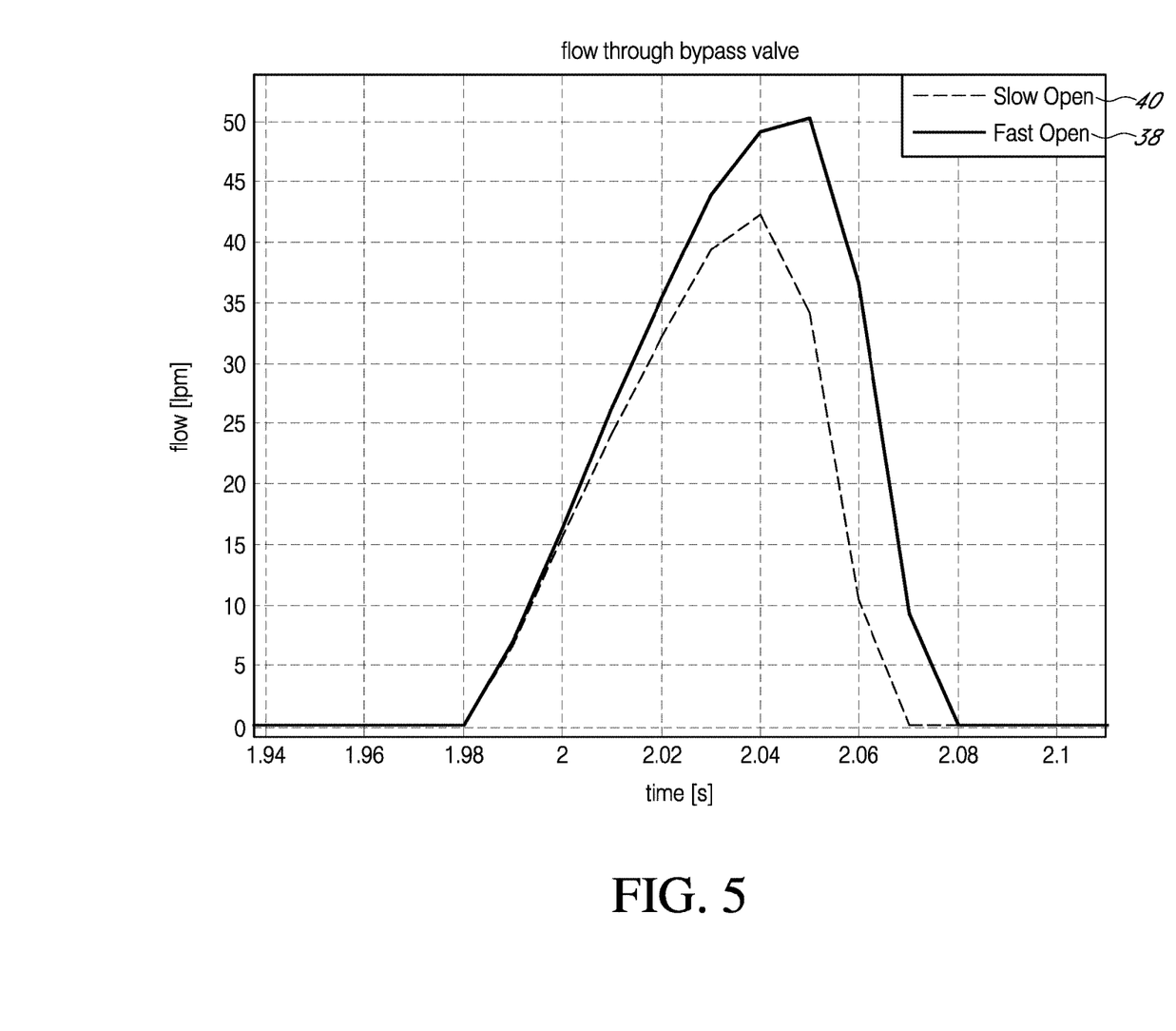
FIG. 5 is graph of flow through a bypass valve of a hydraulic system for maintaining minimum low side pressure of a closed circuit hydraulic system.

Simultaneously, FIGS. 4A and 4B show that the absence of the bypass valve 30 results in a sharp decrease of pressure in the low side 18a, which is below the minimum low side pressure 34 of 10 bar, i.e., the low loop event 36.

In contrast, FIGS. 4A and 4B show that the low loop event 36 from the shock load 42 does not occur when the bypass valve 30 is present. Instead, the bypass valve 30 opens when pressure lowers to 15 bar or below (i.e. the preset pressure 32), thereby preventing the low loop from going to or below 10 bar (i.e. minimum low side pressure 34).

From the above discussion and accompanying figures and claims, it will be appreciated that the hydraulic system 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A hydraulic system, comprising:
a hydraulic pump connected and in communication with a hydraulic motor by a first conduit and a second conduit;
a bypass valve connected between and in communication with the first conduit and the second conduit;
the bypass valve having a preset pressure that is above a minimum low side pressure, wherein the bypass valve is configured to open upon a pressure of the second conduit going below the preset pressure; and
wherein the minimum low side pressure is approximately equivalent to a low loop event.

2. The hydraulic system of claim 1 wherein the bypass valve is configured to have a fast open.

3. The hydraulic system of claim 1 wherein the bypass valve is configured to have a slow open.

4. The hydraulic system of claim 1 further comprising a loop flushing system connected between and in communication with the first conduit and the second conduit.

5. The hydraulic system of claim 4 wherein the bypass valve is directly downstream from and parallel to the loop flushing system.

6. The hydraulic system of claim 1 wherein when the bypass valve is opened, a high pressure fluid is ported from the first conduit to the second conduit.

7. The hydraulic system of claim 1 wherein no accumulator is in communication with the first conduit or the second conduit.

8. The hydraulic system of claim 1 wherein the bypass valve is configured to delay effect of a shock load.

9. The hydraulic system of claim 1 wherein when the bypass valve is opened, the pressure of the second conduit is prevented from going below the minimum low side pressure.

10. The hydraulic system of claim 1 wherein a low loop event occurs at approximately the minimum low side pressure.

* * * * *